United States Patent
Loos et al.

(10) Patent No.: US 11,884,317 B2
(45) Date of Patent: Jan. 30, 2024

(54) METHOD FOR POSITIONING A STEERING WHEEL OF A MOTOR VEHICLE IN A REST POSITION AND/OR AN EASY-ENTRY POSITION AND A MOTOR VEHICLE TO CARRY OUT THE METHOD

(71) Applicant: AUDI AG, Ingolstadt (DE)

(72) Inventors: Sebastian Loos, Ingolstadt (DE); Richard Schroeder, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 305 days.

(21) Appl. No.: 17/377,973

(22) Filed: Jul. 16, 2021

(65) Prior Publication Data
US 2022/0063704 A1 Mar. 3, 2022

(30) Foreign Application Priority Data
Aug. 26, 2020 (DE) .......................... 102020122327.7

(51) Int. Cl.
*B62D 1/183* (2006.01)
*B62D 1/10* (2006.01)
(Continued)

(52) U.S. Cl.
CPC ............ *B62D 1/183* (2013.01); *B60R 16/037* (2013.01); *B60W 10/20* (2013.01); *B62D 1/10* (2013.01);
(Continued)

(58) Field of Classification Search
CPC .......... B62D 1/183; B62D 1/10; B62D 1/181; B60R 16/037; B60W 10/20;
(Continued)

(56) References Cited

U.S. PATENT DOCUMENTS

2016/0075331 A1* 3/2016 Tomozawa ............ B60W 30/06
   701/41
2017/0021862 A1* 1/2017 Akatsuka .............. B60W 50/14
(Continued)

FOREIGN PATENT DOCUMENTS

CN  108116485 A  6/2018
CN  109774779 A  5/2019
(Continued)

OTHER PUBLICATIONS

German Search Report dated Dec. 1, 2020 in corresponding German Application No. 102020122327.7; 12 pages; Machine translation attached.
(Continued)

*Primary Examiner* — Jonathan M Dager
*Assistant Examiner* — Jean W Charleston
(74) *Attorney, Agent, or Firm* — Maier & Maier, PLLC

(57) ABSTRACT

A method for positioning a steering wheel of a motor vehicle in a rest position and/or an easy-entry position. The steering wheel has an operative connection to an adjustment means via which the steering wheel can be moved in a steering wheel adjustment field. A most recently set steering wheel position is established as the current steering wheel position. A target position in the steering wheel adjustment field, which represents the maximum increase in space for a driver in relation to the currently set steering wheel position, is determined. This target position is established as a rest position and/or as an easy-entry position. The steering wheel is moved into the established rest position and/or easy-entry position.

9 Claims, 2 Drawing Sheets

(51) Int. Cl.
  *B60R 16/037* (2006.01)
  *B60W 10/20* (2006.01)
  *B60W 50/00* (2006.01)
  *B60N 2/02* (2006.01)

(52) U.S. Cl.
  CPC .... *B60N 2/0272* (2023.08); *B60W 2050/0085* (2013.01); *B60W 2540/227* (2020.02)

(58) Field of Classification Search
  CPC .... B60W 2050/0085; B60W 2540/227; B60N 2002/0272
  USPC .......................................................... 701/49
  See application file for complete search history.

(56) References Cited

U.S. PATENT DOCUMENTS

| | | | | |
|---|---|---|---|---|
| 2017/0297606 | A1* | 10/2017 | Kim | B62D 1/185 |
| 2018/0237051 | A1 | 8/2018 | von Freyberg et al. | |
| 2018/0239483 | A1* | 8/2018 | Brombach | B60R 1/072 |
| 2020/0114968 | A1* | 4/2020 | Xu | B60D 1/36 |
| 2020/0276916 | A1* | 9/2020 | Kieser | B60N 2/0224 |
| 2021/0101638 | A1* | 4/2021 | Obermüller | B60W 50/08 |
| 2021/0124349 | A1* | 4/2021 | Koehler | B62D 1/185 |
| 2021/0179167 | A1* | 6/2021 | Boos | B62D 6/10 |

FOREIGN PATENT DOCUMENTS

| | | | | |
|---|---|---|---|---|
| DE | 102008054310 | B4 | 9/2010 | |
| DE | 102013110865 | A1 | 4/2015 | |
| DE | 102016125839 | A1 * | 7/2017 | ............ B62D 1/181 |
| DE | 102016125839 | A1 | 7/2017 | |
| DE | 102018211041 | A1 | 1/2020 | |
| DE | 102019120543 | A1 | 2/2020 | |

OTHER PUBLICATIONS

Office Action dated Oct. 19, 2023, in corresponding Chinese Application No. 202110966115.6, 12 pages.

* cited by examiner

METHOD FOR POSITIONING A STEERING WHEEL OF A MOTOR VEHICLE IN A REST POSITION AND/OR AN EASY-ENTRY POSITION AND A MOTOR VEHICLE TO CARRY OUT THE METHOD

FIELD

The invention relates to a method for positioning a steering wheel of a motor vehicle in a rest position and/or an easy-entry position.

BACKGROUND

Electronically adjustable steering columns are well known from the prior art and enable the driver to adjust the steering wheel individually to his seated position. As a rule, the driver can adjust the position of the steering wheel in the longitudinal and vertical directions of the vehicle. Reference is made to DE 10 2008 054 310 B4 solely by way of example.

Using the existing adjustment options of the steering wheel to enable a driver to get in and out comfortably is also known. For this purpose, the steering wheel is moved by an adjustment movement—normally oriented forward and/or upward—into a fixed steering wheel position, referred to hereinafter as the easy-entry position.

DE 10 2019 120 543 A1 discloses a method for automatically stowing and unstowing a steering column arrangement. The method provides, inter alia, that during an autonomous or semi-autonomous journey, i.e., in driving situations in which the steering wheel is not needed, the steering wheel—analogous to the easy-entry position—can be moved to a rest position so that a driver has more space available, for example, to be able to carry out non-driving activities.

The invention is based on the finding that the maximum increase in space that can be achieved when moving into the easy-entry position and/or the rest position is determined by the currently set steering wheel position. If, for example, a driver has set a position as the current steering wheel position which nearly corresponds to the defined easy-entry position, moving into the easy-entry position results in almost no space increase; in the extreme case, there is no space increase at all.

SUMMARY

The invention is based on the object of specifying a method for positioning a steering wheel of a motor vehicle in a rest position and/or an easy-entry position so that the greatest possible increase in space is made possible—considered in relation to the current driver.

According to the method for positioning a steering wheel of a motor vehicle in a rest position and/or an easy-entry position, the steering wheel has an operative connection to adjustment means via which the steering wheel can be moved in a steering wheel adjustment field.

The method according to the invention is distinguished by the following method steps:
establishing a steering wheel position that was last set as the current steering wheel position;
determining a target position in the steering wheel adjustment field, which represents the greatest possible or maximum increase in space for a driver in relation to the currently set steering wheel position;
establishing this target position as a rest position and/or as an easy-entry position;
moving the steering wheel to the establishing rest position and/or easy-entry position.

The method according to the invention proves to be particularly advantageous because, in contrast to the prior art, the steering wheel is not moved into a previously defined, i.e., established position, but instead into a position that takes into consideration the current steering wheel position as an easy-entry position and/or as a rest position, so that an optimized increase in space is possible in comparison to the prior art.

The determination of the target position, that is to say the determination of the steering wheel position promising the maximum increase in space, is preferably carried out by
establishing a seat position set in the current steering wheel position as the reference position;
determining an actual distance dimension $A_{actual}$ between a defined point on the steering wheel and a defined point of the seat in the reference position;
for all n-possible steering wheel positions in the steering wheel adjustment field, the associated distance dimensions $A_n$ are determined between the defined point of the steering wheel and the defined point of the seat in the reference position;
a maximum for the ratio of $A_n/A_{actual}$ is determined,
the distance dimension A, at which the ratio of $A_n/A_{actual}$ has the maximum, is established as the position with the maximum increase in space.

Determining the steering wheel position promising the maximum increase in space using a distance dimension is advantageous in that the corresponding evaluation can be carried out with the aid of a central regulating-control unit installed as a standard feature in current motor vehicles, so that an inexpensive and low-effort implementation of the routine is enabled.

According to one embodiment, the previously established or defined points for determining the rest position and the easy-entry position are identical, i.e., the point defined for the steering wheel and the point defined for the driver seat are used both for defining the rest position and also for defining the easy-entry position.

A preferred alternative embodiment provides that different steering wheel and driver seat points are used for establishing the rest position and for establishing the easy-entry position. Since in particular the distance between the lower edge of the steering wheel and the front edge of the driver seat is decisive for comfortable entry and exit (⇒easy-entry position) and in particular the distance between the steering wheel center point and a central point of the backrest is decisive for performing activities other than driving during an autonomous journey (rest position), by establishing differently defined points for determining the easy-entry position in the rest position (⇒for example, for easy-entry: established steering wheel point is the bottom point of the steering wheel in the neutral position; established driver seat point is a point of the front edge of the driver seat, or for rest position: established steering wheel point is the center point of the steering wheel; established driver seat point is a central point of the backrest of the driver seat), an increase in space optimized to the respective situation, namely entry/exit or carrying out activities other than driving, is enabled.

A particularly advantageous embodiment of the invention provides that the steering wheel adjustment field is expanded by an additional adjustment field range which is only released for determining the target position. This means that the steering wheel adjustment field now has an adjustment range that cannot be used by the driver to set his individual steering wheel position. The provision of the additional adjustment field range and the fact that it is not usable to set an individual steering wheel setting has the effect that a sufficiently large adjustment travel is made available for all possible, individually settable steering wheel positions.

The additional adjustment field range is preferably selected so that a driver who has set the steering wheel at the top front, for example, allows the same relative adjustment travel to the rest position or to the easy-entry position that would be available to a driver in a conventional adjustment field who has set the steering wheel at the back bottom.

The additional adjustment field range of the steering wheel adjustment field is preferably made available by creating an additional degree of freedom. This can be done, for example, by creating an additional mechanical degree of freedom in the steering column mechanism, for example to enable the steering wheel to be adjusted in the transverse direction of the vehicle. In this way, a particularly large additional adjustment field range is made available in an advantageous manner.

A structurally simpler and thus more cost-effective embodiment for creating the additional adjustment field range provides that the additional adjustment field range is implemented by increasing the existing adjustment travels in the steering wheel adjustment field.

The adjusting means which have an operative connection to the steering wheel are preferably electrically driven. This advantageously enables simplified handling when adjusting the steering wheel.

The movement into the easy-entry position or into the rest position can be initiated, for example, by pressing a corresponding control button.

Another preferred embodiment provides that the movement of the steering wheel into an individual steering wheel position and the movement of the steering wheel into the rest position and/or the easy-entry position are carried out at different adjustment speeds.

The invention is also based on the object of specifying a motor vehicle for carrying out the method.

For this purpose, the motor vehicle comprises a central regulating/control unit, to which a currently set steering wheel position and a currently set driver seat position are made available as input variables and which is configured to determine the rest position and/or the easy-entry position from the data made available.

All embodiments of the method according to the invention may be transferred analogously to the motor vehicle according to the invention, so that the above-mentioned advantages can be achieved thereby.

DETAILED DESCRIPTION

Figure 1:
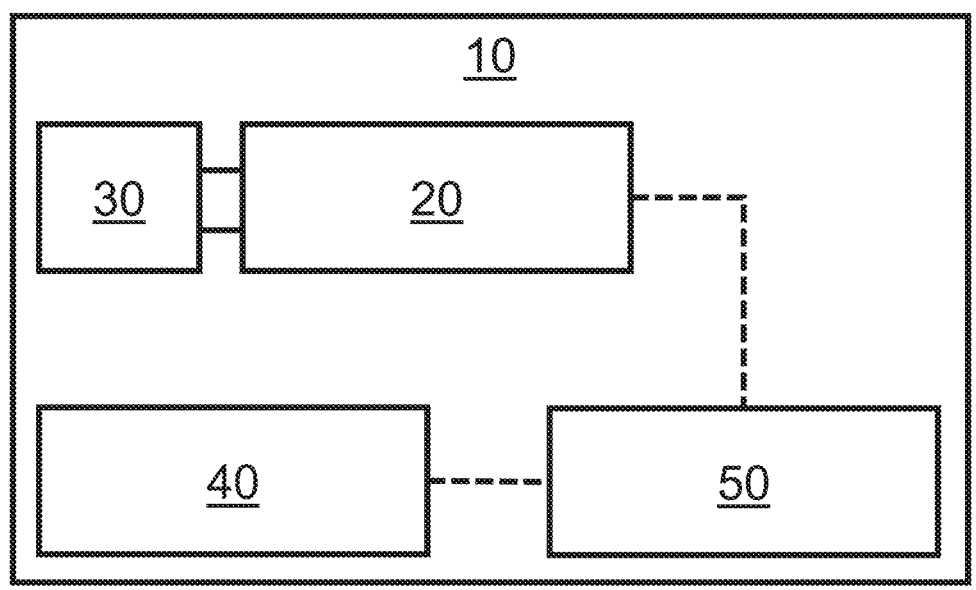
FIG. 1 shows, in schematic form, an embodiment of a motor vehicle according to the present invention.

FIG. 1 shows, in schematic form, an exemplary motor vehicle 10 according to the present invention. The motor vehicle carries out or is capable of carrying out a method for positioning a steering wheel 20 of the motor vehicle 10 in a rest position and/or an easy-entry position. The steering wheel 20 has an operative connection to adjustment means 30 via which the steering wheel 20 can be moved in a steering wheel adjustment field relative to a seat 40 of the motor vehicle 10. The motor vehicle 10 may be provided with a control unit 50 which is configured to execute the method for positioning the steering wheel 20.

Figure 2:
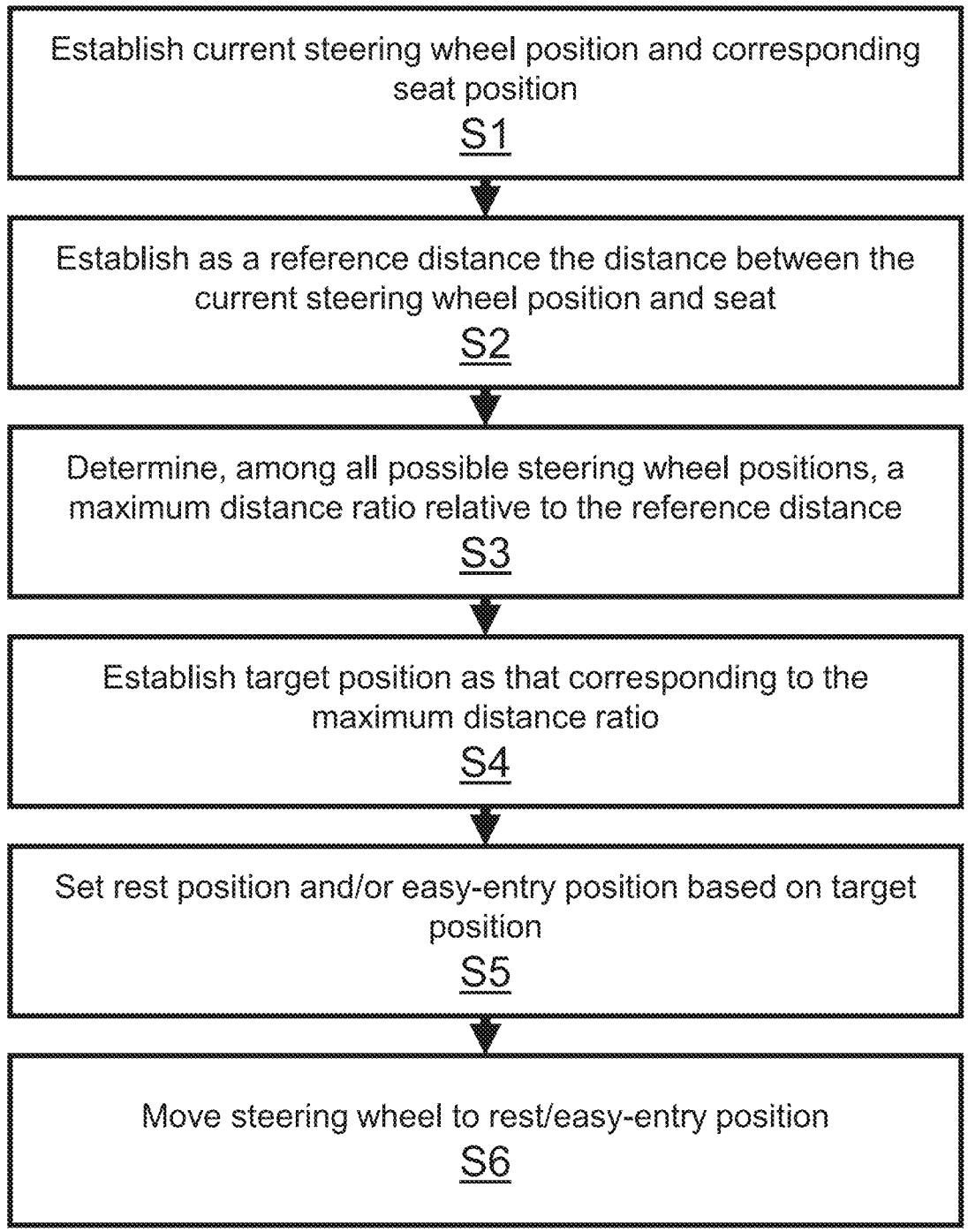
FIG. 2 shows a flow chart of an exemplary method according to the present invention.

FIG. 2 shows an exemplary method which, when executed, serves to position the steering wheel 20 of the motor vehicle 10 in a rest position and/or an easy-entry position. The method is characterized by the following steps:

establishing a steering wheel position that was last set as the current steering wheel position (S1);

determining a target position in the steering wheel adjustment field, which represents the greatest possible or maximum increase in space for a driver in relation to the currently set steeling wheel position (S4);

establishing this target position as a rest position and/or as an easy-entry position (S5); and moving the steering wheel to the establishing rest position and/or easy-entry position (S6).

Determining the target position is preferably accomplished by:

establishing a seat position set in the current steering wheel position as the reference position (S2);

determining an actual distance dimension $A_{actual}$ between a defined point on the steering wheel and a defined point of the seat in the reference position;

for all n-possible steering wheel positions in the steering wheel adjustment field, the associated distance dimensions $A_n$ are determined between the defined point of the steering wheel and the defined point of the seat in the reference position;

a maximum for the ratio of $A_n/A_{actual}$ is determined (S3); and the distance dimension A, at which the ratio of $A_n A_{actual}$ is the maximum, is established as the position with the maximum increase in space (S4).

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art (for example, features associated with certain configurations of the invention may instead be associated with any, other configurations of the invention, as desired).

The invention claimed is:

1. A method for positioning a steering wheel of a motor vehicle in a rest position and/or an easy-entry position, wherein the steering wheel has an operative connection to an adjustment means via which the steering wheel is movable in a steeling wheel adjustment field, the method comprising:

establishing a steering wheel position that was last set as a current steering wheel position;

determining a target position in the steering wheel adjustment field, which represents a maximum increase in space for a driver in relation to a currently set steering wheel position;

establishing the target position as a rest position and/or as an easy-entry position; and moving the steering wheel to the established rest position and/or easy-entry position, wherein:

a seat position set in the current steering wheel position is established as a reference position;

an actual distance dimension between a defined point of the steering wheel and a defined point of a driver seat in the reference position is determined;

for all n-possible steering wheel positions in the steering wheel adjustment field, associated distance dimensions between the defined point of the steering wheel and the defined point of the driver seat in the reference position are determined;

a maximum for a ratio between the actual distance dimension and the associated distance dimensions are determined; and a distance dimension, at which the ratio has the maximum, is defined as the target position which represents the maximum increase in space.

2. The method as claimed in claim 1, wherein the defined point of the steering wheel and the defined point for the driver seat can be used both for establishing the rest position and also for establishing the easy-entry position.

3. The method as claimed in claim 1, wherein different steering wheel and driver seat points are used to establish the rest position and to establish the easy-entry position.

4. The method as claimed in claim 1, wherein the steering wheel adjustment field is expanded by an additional adjustment field range which is only released for determining the target position.

5. The method as claimed in claim 4, wherein the additional adjustment field range of the steering wheel adjustment field is made available by creating an additional mechanical degree of freedom.

6. The method as claimed in claim 4, wherein the additional adjustment field range of the steering wheel adjustment field is implemented by increasing an existing, adjustment travel in the steering wheel adjustment field.

7. The method as claimed in claim 1, wherein the adjusting means has an operative connection to the steering wheel and is electrically driven.

8. The method as claimed in claim 7, wherein a movement of the steering wheel into an individual steering wheel position and a movement of the steering wheel into the rest position and/or the easy-entry position are carried out at different adjustment speeds.

9. A motor vehicle for carrying out the method as claimed in claim 1, wherein the motor vehicle includes a central control unit, to which the currently set steering wheel position and a currently set driver seat position are made available as input variables and which is configured to determine the rest position and/or the easy-entry position from the input variables.

* * * * *